US012742104B2

(12) United States Patent
Veeraraghavan

(10) Patent No.: US 12,742,104 B2
(45) Date of Patent: Sep. 22, 2026

(54) ENERGY SAVING, LOW TEMPERATURE CURABLE, PUMPABLE, STRUCTURAL ADHESIVE COMPOSITIONS FOR USE IN AUTOMOTIVE BODY-IN-WHITE (BIW) APPLICATIONS

(71) Applicant: Thanikaivelan Tindivanam Veeraraghavan, Newburgh, IN (US)

(72) Inventor: Thanikaivelan Tindivanam Veeraraghavan, Newburgh, IN (US)

(73) Assignee: Uniseal, Inc., Evansville, IN (US)

( * ) Notice: Subject to any disclaimer, the term of this patent is extended or adjusted under 35 U.S.C. 154(b) by 577 days.

(21) Appl. No.: 18/230,309

(22) Filed: Aug. 4, 2023

(65) Prior Publication Data

US 2025/0043163 A1 Feb. 6, 2025

(51) Int. Cl.
*C09J 163/00* (2006.01)
*C09J 11/04* (2006.01)
*C09J 11/08* (2006.01)

(52) U.S. Cl.
CPC ............. *C09J 163/00* (2013.01); *C09J 11/04* (2013.01); *C09J 11/08* (2013.01); *C09J 2203/354* (2020.08); *C09J 2301/408* (2020.08)

(58) Field of Classification Search
CPC ............ C09J 163/00; C09J 11/04; C09J 11/08
USPC .......................................................... 523/429
See application file for complete search history.

(56) References Cited

U.S. PATENT DOCUMENTS 2,510,727 A 6/1950 Sussenbach
3,214,564 A 10/1965 Katzer et al.
3,493,257 A 2/1970 Fitzgerald et al.
3,850,474 A 11/1974 Welch
3,873,348 A 3/1975 Reilly et al.
4,252,906 A 2/1981 Hosokawa et al.
4,391,318 A 7/1983 Maxey et al.
4,456,706 A 6/1984 Siedenstrang et al.
4,569,382 A 2/1986 Maxey et al.
4,680,316 A 7/1987 Douglas
4,693,772 A 9/1987 Douglas
4,740,393 A * 4/1988 Cody ....................... C08K 3/22 106/14.39
4,978,474 A 12/1990 Johnston
5,739,209 A 4/1998 Lassila et al.
6,830,799 B1 12/2004 Duffin et al.
8,545,667 B2 * 10/2013 Lammerschop ....... C09J 163/00 523/427
8,973,809 B2 3/2015 Hill et al.
9,632,268 B2 4/2017 Coenegracht et al.
9,856,374 B2 1/2018 Kelch et al.
10,428,252 B2 10/2019 Burckhardt et al.
10,683,442 B2 6/2020 Xu-Rabl et al.
10,899,926 B2 1/2021 Kasemi et al.
11,274,236 B2 3/2022 Auvil et al.
2003/0109603 A1 * 6/2003 Drzal .................... C08L 51/003 523/400
2011/0024039 A1 2/2011 Campbell et al.
2011/0036497 A1 * 2/2011 Lammerschop ....... C09J 163/00 427/386
2017/0015824 A1 1/2017 Gozalo et al.
2017/0292049 A1 * 10/2017 Jialanella ............... C09J 175/04
2018/0258329 A1 9/2018 Koch et al.
2018/0282592 A1 * 10/2018 Cura .................... C08G 59/223
2019/0352549 A1 * 11/2019 Auvil ................. C08G 59/4021
2020/0231849 A1 * 7/2020 Auvil ...................... C08L 63/00
2022/0227991 A1 7/2022 Mayer et al.
2023/0074509 A1 * 3/2023 Veeraraghavan .. C08G 59/5073

FOREIGN PATENT DOCUMENTS

CN 102391813 A * 3/2012
CN 110643306 1/2020
CN 112029459 12/2020
CN 113736403 12/2021
WO WO-2020065456 A1 * 4/2020 ......... C08G 18/3228
WO WO 23/126860 7/2023

OTHER PUBLICATIONS https://www.specialchem.com/adhesives/product/kukdo-chemical-epokukdo-yd-011 (Year: 2023).*
PCT Written Opinion and International Search Report of the International Searching Authority for International Application No. PCT/US23/029489 mailed May 1, 2024.

* cited by examiner

*Primary Examiner* — Deve V Hall
(74) *Attorney, Agent, or Firm* — King & Partners, PLC

(57) ABSTRACT

A one-component curable structural adhesive composition which cures to form a cured product, including a hybrid epoxy resin system and a silane adhesion promoter, wherein the structural adhesive composition is low energy curable (e.g., capable of curing at temperatures below 140° C. in 15 minutes or less), and the cured product is crash durable and exhibits high wash resistance.

21 Claims, 1 Drawing Sheet

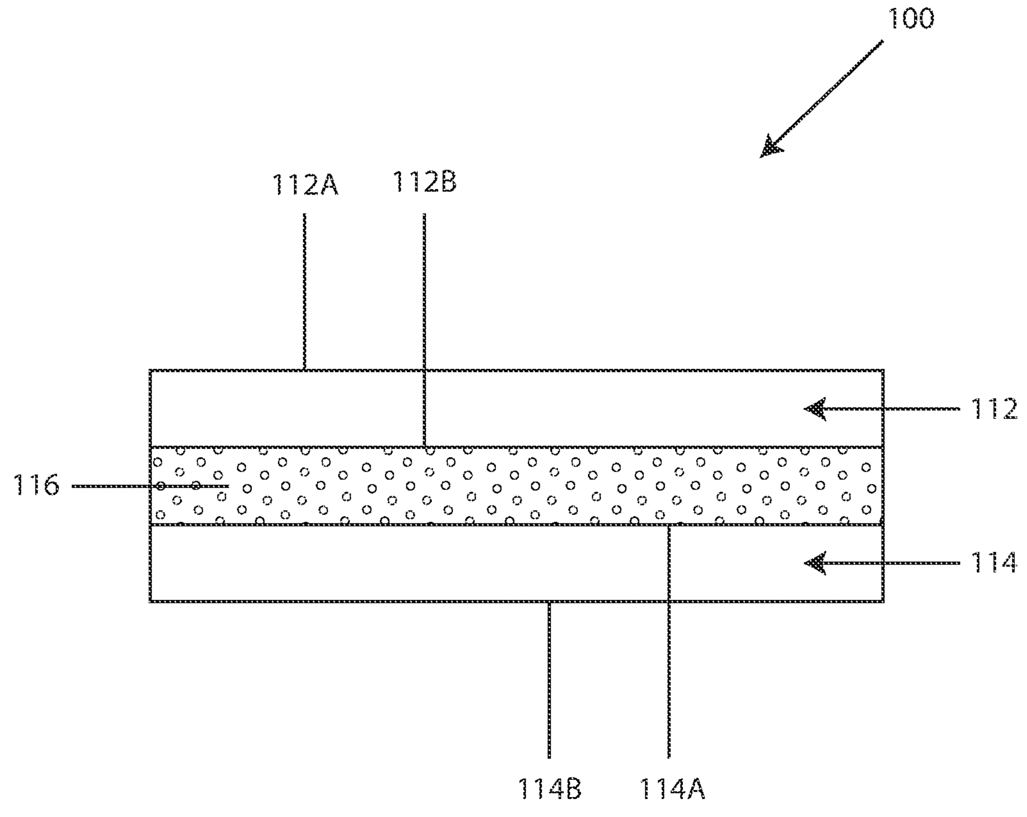
100
112A
112B
112
116
114
114B
114A

ENERGY SAVING, LOW TEMPERATURE CURABLE, PUMPABLE, STRUCTURAL ADHESIVE COMPOSITIONS FOR USE IN AUTOMOTIVE BODY-IN-WHITE (BIW) APPLICATIONS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to one-component structural adhesives for automotive assembly applications, and, more particularly, to epoxy-based, low energy curable, crash durable, high wash resistance structural adhesive compositions for the assembly of vehicle parts, including, but not limited to, cars, sport utility vehicles, vans, trucks, trains, etcetera.

2. Background Art

Currently, the automotive industry is facing on-going challenges to improve the sustainability of its manufacturing processes and reduce CO2 emissions due to environmental, economic, marketability, and policy concerns.

The automotive industry continuously explores new opportunities for energy efficiency options. The industry aims to reduce production costs and yet maintain the quality of the product, customer satisfaction and safety of the passengers in their automobiles. Energy efficiency is crucial to reduce the pollutant emissions into the atmosphere and the automakers find it challenging to increase the output of the products while adhering to energy efficiency practices and technology investment.

To reduce energy consumed during manufacturing processes, the industry is particularly focusing on thermal management of low-temperature heat sources that are extensively present in the whole plant and especially in the paint shop (e.g., e-coat baking, paint baking process, etcetera).

Upon evaluating the entire vehicle manufacturing process, the paint shop has been identified as the highest energy consuming component in the production process. As such, automotive manufacturers are focusing on energy efficiency and thermal management especially during e-coat baking and the paint baking process.

The present invention is directed to structural adhesive compositions which can match the challenging design requirements of low energy curing, high crash durability, and high wash resistance. Notably, currently available structural adhesives require a minimum of 30 minutes at 340° F. (170° C.) or more to cure. The novel structural adhesive compositions of the present invention only require 15 minutes at 285° F. (140° C.) to cure.

Simple energy consumption models show that lowering the oven set point temperatures by only 55° F. and reducing manufacturing time by as little as 10 minutes results in an energy savings of around 10-15%, which is not only significant, but critically important toward being environmentally responsible at a global level. Moreover, by lowering the curing time, more cars can be manufactured per hour, thereby reducing production costs.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to a one-component curable structural adhesive composition which cures to form a cured product, comprising, consisting essentially of, and/or consisting of: (a) at least two different epoxy resins; and (b) a silane adhesion promoter, wherein the structural adhesive composition is low energy curable, and the cured product is crash durable and exhibits high wash resistance. Preferably, the adhesive composition is a room temperature pumpable structural adhesive composition which is capable of curing at temperatures below 140° C. in 15 minutes or less.

The present invention is also directed to a one-component curable structural adhesive composition which cures to form a cured product, comprising, consisting essentially of, and/or consisting of: (a) a bisphenol A liquid epoxy resin; (b) a bisphenol F liquid epoxy resin; (c) a bisphenol A solid epoxy resin; (d) a first toughening agent; (e) a second toughening agent; (f) at least one filler material; (g) a substate wetting agent; (h) a corrosion inhibiting agent; (i) an amine curing agent; (j) a modified imidazole curing agent; (k) an accelerating agent; and (l) a silane adhesion promoter.

In a preferred embodiment of the present invention, the bisphenol A liquid epoxy resin comprises a bisphenol A diglycidyl ether epoxy resin present from approximately 15 percent to approximately 40 percent of the total weight of the composition. In this embodiment, the bisphenol A diglycidyl ether epoxy resin is preferably represented by the following chemical structure and derivatives thereof:

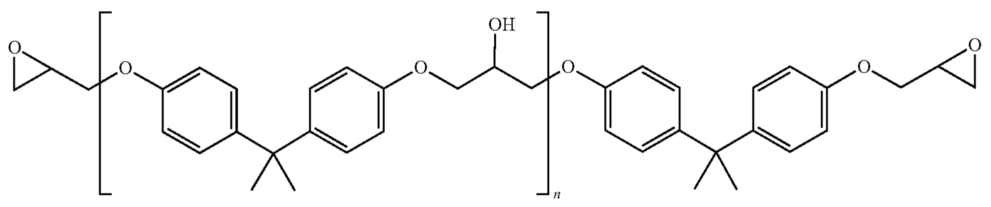

wherein n is 0 or an integer ranging from approximately 1 to approximately 25.

In another preferred embodiment of the present invention, the bisphenol F liquid epoxy resin comprises a bisphenol F diglycidyl ether epoxy resin present from approximately 5 percent to approximately 20 percent of the total weight of the composition. In this embodiment, the bisphenol F diglycidyl ether epoxy resin is preferably represented by the following chemical structures and derivatives thereof:

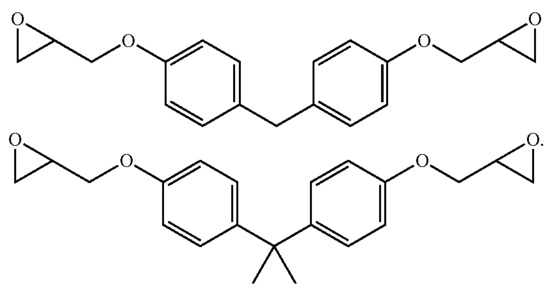

In yet another preferred embodiment of the present invention, the bisphenol A solid epoxy resin comprises a bisphenol A unmodified solid epoxy resin present from approximately 5 percent to approximately 20 percent of the total weight of the composition.

In one preferred embodiment of the present invention, the first toughening agent comprises an epoxy terminated polyurethane interpenetrating network present from approximately 10 percent to approximately 25 percent of the total weight of the composition. In this embodiment, the first toughening agent is preferably represented by the following chemical structure and derivatives thereof:

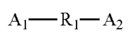

wherein $A_1$ is represented by the following chemical structure:

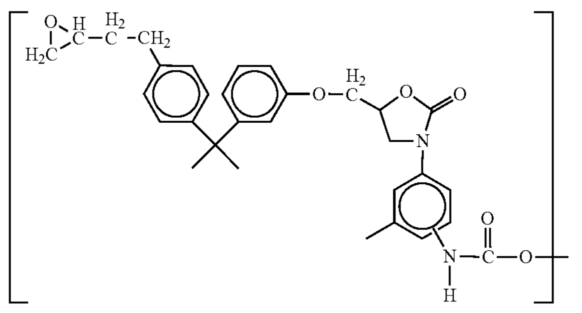

wherein $R_1$ comprises an alkyl, alkenyl, and/or alkynyl group containing 1 to approximately 36 carbon atoms, an oligomer, and/or a urethane polymer; and wherein $A_2=A_1$.

In a preferred implementation of the present invention, the second toughening agent comprises polybutadiene rubber particles pre-dispersed into a thermosetting resin present from approximately 10 percent to approximately 25 percent of the total weight of the composition.

In another preferred implementation of the present invention, the filler material(s) comprise inorganic oxides, fumed silica, carbon black, and/or calcium metasilicate present from approximately 5 percent to approximately 15 percent of the total weight of the composition.

In yet another preferred implementation of the present invention, the substate wetting agent comprises a silicone acrylate copolymer, a polysiloxane and/or fluoro-modified surfactants present from approximately 0.5 percent to approximately 5 percent of the total weight of the composition.

In one preferred implementation of the present invention, the corrosion inhibiting agent comprises group I, group II, and transition metal phosphosilicates present from approximately 5 percent to approximately 10 percent of the total weight of the composition.

In a preferred embodiment of the present invention, the amine curing agent comprises a dicyanamide present from approximately 2 percent to approximately 10 percent of the total weight of the composition.

In another preferred embodiment of the present invention, the modified imidazole curing agent comprises an encapsulated modified imidazole present from approximately 0.5 percent to approximately 2 percent of the total weight of the composition.

In yet another preferred embodiment of the present invention, the accelerating agent comprises one or more substituted urea(s) present from approximately 0.5 percent to approximately 4 percent of the total weight of the composition.

In one preferred embodiment of the present invention, the silane adhesion promoter comprises a bi-functional organosilane possessing a reactive organic epoxide group and a hydrolysable inorganic methoxysilyl group present from approximately 0.5 percent to approximately 2 percent of the total weight of the composition.

In a preferred implementation of the present invention, the one-component structural adhesive composition further comprises a solvent, a rheology modifier, a thixotropic agent, a pigment, and/or an adjunct agent.

The present invention is directed to a one-component curable structural adhesive composition which cures to form a cured product, comprising, consisting essentially of, and/or consisting of: (a) a bisphenol A liquid epoxy resin, wherein the bisphenol A liquid epoxy resin is present from approximately 15 percent to approximately 40 percent of the total weight of the composition; (b) a bisphenol F liquid epoxy resin, wherein the bisphenol F liquid epoxy resin is present from approximately 5 percent to approximately 20 percent of the total weight of the composition; (c) a bisphenol A solid epoxy resin, wherein the bisphenol A solid epoxy resin is present from approximately 5 percent to approximately 20 percent of the total weight of the composition; (d) a first toughening agent, wherein the first toughening agent is present from approximately 10 percent to approximately 25 percent of the total weight of the composition; (e) a second toughening agent, wherein the second toughening agent is present from approximately 10 percent to approximately 25 percent of the total weight of the composition; (f) one or more filler materials, wherein the filler material(s) is present from approximately 5 percent to approximately 15 percent of the total weight of the composition; (g) a substate wetting agent, wherein the substate wetting agent is present from approximately 0.5 percent to approximately 5 percent of the total weight of the composition; (h) a corrosion inhibiting agent, wherein the corrosion inhibiting agent is present from approximately 5 percent to approximately 10 percent of the total weight of the composition; (i) an amine curing agent, wherein the amine curing agent is present from approximately 2 percent to approximately 10 percent of the total weight of the composition; (j) a modified imidazole curing agent, wherein the modified imidazole curing agent is present from approximately 0.5 percent to approximately 2 percent of the total weight of the composition; (k) a first accelerating agent, wherein the first accelerating agent is present from approximately 0.5 percent to approximately 2 percent of the total weight of the composition; (l) a second accelerating agent, wherein the second accelerating agent is present from approximately 0.5 percent to approximately 2 percent of the total weight of the composition; (m) a rheology modifier, wherein the rheology modifier is present from approximately 0.5 percent to approximately 2 percent of the total weight of the composition; (n) a thixotropic agent, wherein the thixotropic agent is present from approximately 2 percent to approximately 10 percent of the total weight of the composition; (o) a pigment, wherein the pigment is present from approximately 0.05 percent to approximately 1 percent of the total weight of the composition; and (p) a silane adhesion promoter, wherein the silane adhesion promoter is present from approximately 0.5 percent to approximately 2 percent of the total weight of the composition.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

The invention will now be described with reference to the drawings wherein:

FIG. 1 of the drawings is a cross-sectional schematic representation of a component assembly (e.g., an automobile component sub-assembly) associated with a structural adhesive composition of the present invention.

DETAILED DESCRIPTION OF THE INVENTION

While this invention is susceptible of embodiment in many different forms and applications, there are shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

As will be discussed and shown experimentally hereinbelow, the present invention is directed to novel, one-component, curable structural adhesive compositions which cure to form cured products. The curable structural adhesive compositions of the present invention utilize hybrid epoxy resin systems along with silane adhesion promoters, wherein the structural adhesive compositions are low energy curable, and the cured products are crash durable and exhibit high wash resistance. Notably, certain embodiments of the present invention provide for adhesive compositions that are room temperature pumpable and capable of curing at temperatures below 140° C. in 15 minutes or less. The compositions of the present invention are useful for adhesives that are used to adhere, for example, inner and outer panels together (e.g., hoods, A-pillars, B-pillars, C-pillars, roofs, doors, deck lids, trunks, corner panels, etcetera).

Referring now to the drawings, and to FIG. 1 in particular, component assembly 100 is shown, which generally comprises first substrate 112 having first surface 112A and second surface 112B, second substrate 114 having first surface 114A and second surface 114B and cured structural adhesive or product 116. It will be understood that component assembly 100 may comprise, for illustrative purposes only, a sub-assembly or part of an automobile. Indeed, the structural adhesives of the present invention are suitable for a plurality of applications.

First substrate 112 may be fabricated from any one of a number of materials, such as, for example, steel, steel electrogalvanized with zinc, steel hot dipped galvanized with zinc, aluminum, metal alloys, d-block metals, and combinations thereof. First substrate 112 may also be fabricated from carbon fiber-reinforced polymer substrates, as well as, for example, borosilicate glass, soda lime glass, float glass, natural and synthetic polymeric resins, plastics, and/or composites including Topas®, which is commercially available from Ticona of Summit, New Jersey. First substrate 112 is preferably fabricated from a sheet having a thickness ranging from approximately 0.25 mm to approximately 5.00 mm, and more preferably ranging from approximately 0.75 mm to approximately 2.50 mm. It will be understood, that unless specified otherwise, the term approximately, as used herein, will be defined as the value, number, and/or integer+/− 10 percent. Of course, the thickness of the substrate will depend largely upon the particular application of the assembly. While particular substrate materials have been disclosed, for illustrative purposes only, it will be understood that numerous other substrate materials are likewise contemplated for use-so long as the materials exhibit appropriate physical properties, such as strength, to be able to operate effectively in conditions of intended use. Indeed, substrate assemblies in accordance with the present invention can be, during normal operation, exposed to oxidative environments and extreme temperature variation, as well as substantial UV radiation, emanating primarily from the sun.

Second substrate 114 may be fabricated from similar and/or dissimilar materials as that of first substrate 112. As such, second substrate 114 may comprise polymers, metals, glass, and ceramics—to name a few. Second substrate 114 is preferably fabricated from a sheet having a thickness ranging from approximately 0.25 mm to approximately 5.00 mm, and more preferably ranging from approximately 0.75 mm to approximately 2.50 mm.

As will be discussed herein below, cured structural adhesive or cured product 116 is preferably formed from a low temperature, curable and pumpable composition, comprising: a bisphenol A liquid epoxy resin; a bisphenol F liquid epoxy resin; a bisphenol A solid epoxy resin; a first toughening agent; a second toughening agent; at least one filler material; a substate wetting agent; a corrosion inhibiting agent; an amine curing agent; a modified imidazole curing agent; an accelerating agent; and a silane adhesion promoter. In accordance with the present invention, the compositions convert into cured products 116 at temperatures below approximately 140° C. in less than approximately 15 minutes.

In accordance with the present invention, structural adhesive 116 includes a bisphenol A type liquid epoxy resin. In one embodiment of the present invention, the bisphenol A type liquid epoxy resin comprises a diglycidyl ether of bisphenol A. Non-limiting examples of bisphenol A type liquid resins include DER 330 (Olin Corporation), DER 331 (Olin Corporation), DER 332 (Olin Corporation), DER 383 (Olin Corporation), DER 3171 (Olin Corporation), DER 317 (Olin Corporation), DER 321 (Olin Corporation), DER 3212 (Olin Corporation), DER 322 (Olin Corporation), DER 323 (Olin Corporation), DER 324 (Olin Corporation), DER 325 (Olin Corporation), DER 326 (Olin Corporation), DER 3274 (Olin Corporation), DER 333 (Olin Corporation), DER 3401 (Olin Corporation), DER 346 (Olin Corporation), DER 362 (Olin Corporation), and EPON 825 (Miller-Stephenson). Preferably, the bisphenol A type liquid epoxy resin is present from approximately 15 percent to approximately 14 percent by weight of the structural adhesive.

In a preferred embodiment of the present invention, the bisphenol A diglycidyl ether epoxy resin is represented by the following chemical structure and derivatives thereof:

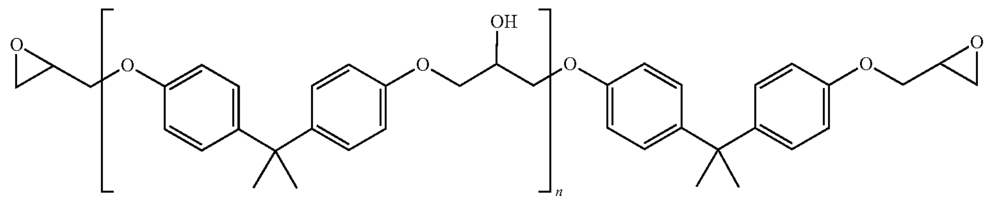

wherein n is 0 or an integer ranging from 1 to approximately 25.

In accordance with the present invention, structural adhesive 116 also includes a bisphenol F type liquid epoxy resin. In one embodiment of the present invention, the bisphenol F type liquid epoxy resin comprises a diglycidyl ether of bisphenol F. Non-limiting examples of bisphenol F type liquid resins include DER 354 (Olin Corporation) and YDF-170 (Kukdo Corporation). Preferably, the bisphenol F type liquid epoxy resin is present from approximately 5 percent to approximately 20 percent by weight of the structural adhesive.

In one preferred embodiment of the present invention, the bisphenol F diglycidyl ether epoxy resin is represented by the following chemical structures and derivatives thereof:

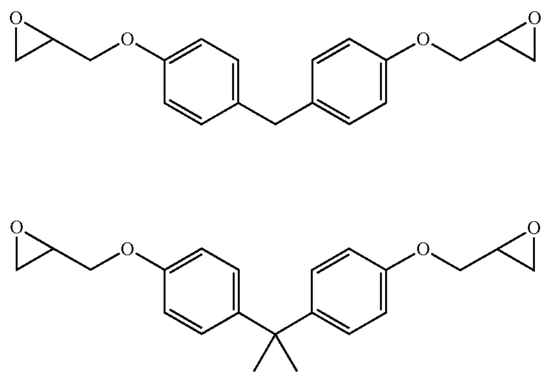 [SMILES: c1cc(OCC2CO2)ccc1Cc1ccc(OCC2CO2)cc1 ; CC(C)(c1ccc(OCC2CO2)cc1)c1ccc(OCC2CO2)cc1]

In accordance with the present invention, structural adhesive 116 also includes a bisphenol A type solid epoxy resin. Non-limiting examples of bisphenol A type solid epoxy resins include RAR 1001 (Huntsman) and YD-011H and YD-017 (Kukdo Corporation).

Preferably, the bisphenol F type liquid epoxy resin is present from approximately 5 percent to approximately 20 percent by weight of the structural adhesive.

In one preferred aspect of the present invention, structural adhesive 116 includes one or more toughening agent that preferably comprises an epoxy terminated polyurethane interpenetrating network represented by the following chemical structure:

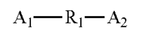

wherein $A_1$ is represented by the following chemical structure:

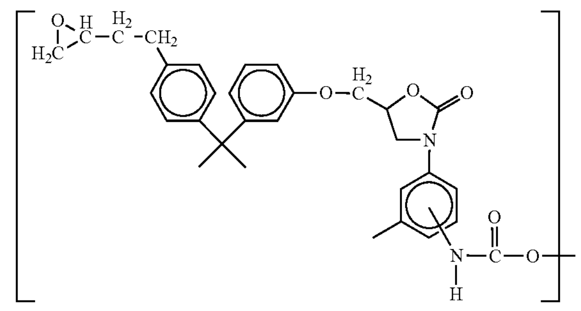

wherein $R_1$ comprises an alkyl, cycloalkyl, polycycloalkyl, heterocycloalkyl, aryl, alkaryl, aralkyl, alkoxy, alkanoyl, aroyl, alkenyl, alkynyl and/or cyano group containing approximately 1 to approximately 75 carbon atoms, an oligomer, and/or a polymer; and wherein $A_2$=$A_1$ and/or comprises an alkyl, cycloalkyl, polycycloalkyl, heterocycloalkyl, aryl, alkaryl, aralkyl, alkoxy, alkanoyl, aroyl, alkenyl, alkynyl and/or cyano group containing approximately 1 to approximately 35 carbon atoms, an oligomer, and/or a polymer.

In another preferred embodiment of the present invention, the toughening agent comprises an epoxy terminated polyurethane interpenetrating network represented by the following chemical structure:

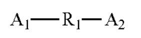

wherein $A_1$ is represented by the following chemical structure:

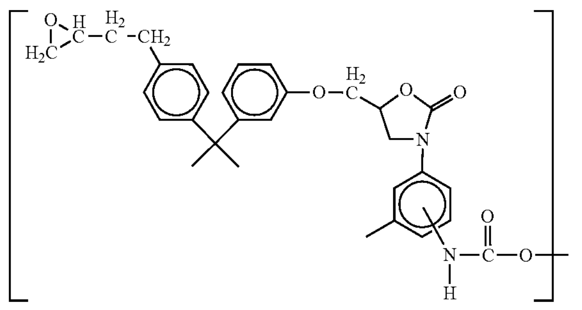

wherein $R_1$ comprises an alkyl, alkenyl, and/or alkynyl group containing approximately 1 to approximately 36 carbon atoms, an oligomer, and/or a urethane polymer; and wherein $A_2$=$A_1$ (Uniseal IPN11, C=36). Preferably, the toughening agent is present from approximately 10 percent to approximately 25 percent by weight of the structural adhesive.

The above-identified toughening agents (e.g., epoxy terminated polyurethane interpenetrating network and/or its precursors) are available from common commercial chemical vendors, such as Sigma-Aldrich Chemical Co., of St. Louis, Missouri.

In another preferred aspect of the present invention, structural adhesive 116 includes a second toughening agent that comprises polybutadiene rubber particles pre-dispersed into a thermosetting resin. Non-limiting examples of second toughening agents include MX 125 (Kaneka), MX 150 (Kaneka), MX 153 (Kaneka), MX 154 (Kaneka), MX 156 (Kaneka), MX 257 (Kaneka), and MX 960 (Kaneka). Preferably, the second toughening agent is present from approximately 10 percent to approximately 25 percent by weight of the structural adhesive.

In one embodiment of the present invention, structural adhesive 116 includes one or more filler materials (e.g., inorganic oxides fumed silica, carbon black, and/or calcium metasilicate). Non-limiting examples of filler materials include fumed silica (Cabosil TS-720, Cabot Corporation), carbon black (Regal 400R, Cabot Corporation), and calcium metasilicate (Vansil W-40, Cabot Corporation). Preferably, the filler materials are present from approximately 5 percent to approximately 15 percent by weight of the structural adhesive.

The adhesive compositions of the present invention also preferably include one or more substrate wetting agents for improving adhesion to oily substrates. Suitable examples include surfactants based on polysiloxanes, polyacrylates and fluoro-modified surfactants. Additional examples include commercially available Tego Disperse 755W, 741W, 653, 670, 652, 656 and BYK 333, 378, 390, 392, and 3550 Disperbyk. The substrate wetting agent is preferably present in a concentration ranging from approximately 0.1 percent by weight to approximately 7.0 percent by weight, and more preferably from approximately 0.5 percent by weight to approximately 5.0 percent by weight.

In another preferred aspect of the present invention, structural adhesive 116 includes a corrosion inhibiting agent that comprises a group I, group II, and/or transition metal phosphosilicates. Non-limiting examples of corrosion inhibiting agents BW-191 and BW-111 (ICL Specialty Products). Preferably, the second toughening agent is present from approximately 5 percent to approximately 10 percent by weight of the structural adhesive.

In one aspect of the present invention, structural adhesive 116 includes one or more curing agents, such as, but not limited to, modified imidazole curing agents and/or a latent amine curing agents. Non-limiting examples of curing agents include dicyandiamide (Omicure DDA-10, Emerald Materials), 1-Phenyl-3,3 dimethyl urea (Amicure UR 7/10, Evonik Corporation, modified imidazole (Technicure LC-80, ACCI specialty materials, 4,4' Methylene bis(phenyl dimethyl urea) (Omicure U52, Emerald Materials), 2,4 Toluene bis dimethyl urea (Omicure U24, Emerald Materials), and cycloaliphatic substituted urea (Omicure U35M, Emerald Materials). Preferably, the modified imidazole curing agent is present from approximately 0.5 percent to approximately 5 percent by weight of the structural adhesive, and preferably the latent amine curing agent is present from approximately 0.5 percent to approximately 10 percent by weight of the structural adhesive.

Provided below are chemical structures for certain curing agents:

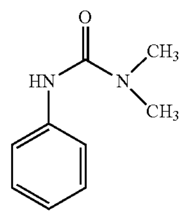

Amicure UR 7/10

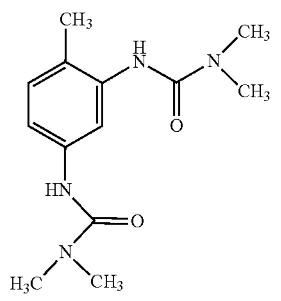

Omicure U24

-continued

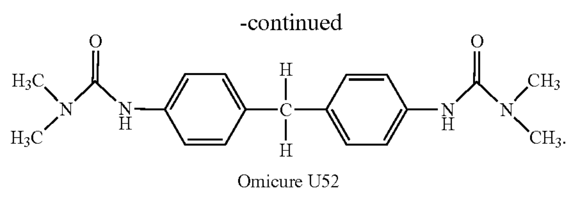

Omicure U52

The structural adhesives of the present invention also preferably include one or more accelerating agents/curing accelerators, such as substituted urea(s). Non-limiting examples of curing accelerators include IPDU-8 (N-3-(dimethylamino) carbonylaminomethyl-3,5,5-trimethylcyclohexyl-N,N-dimethyl urea) (ACCI Specialty Materials) and MDU-11M (4,4'-(methylene bis phenyl dimethyl)) urea) (ACCI Specialty Materials). Preferably, the curing accelerators are each individually present from approximately 0.5 percent to approximately 4 percent by weight of the structural adhesive.

The structural adhesives of the present invention also preferably include a silane adhesion promoter. Non-limiting examples of silane adhesion promoters include Dynasylan VPS 4721 (A bi-functional organosilane possessing a reactive organic epoxide and hydrolysable inorganic methoxysilyl groups) (Evonik).

In another preferred embodiment of the present invention, the structural adhesive comprises silane adhesion promoters represented by the following chemical structures and oligomers, polymers and/or derivatives thereof:

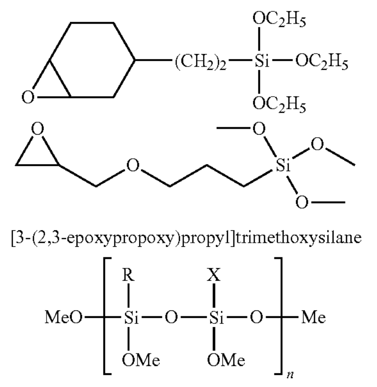

[3-(2,3-epoxypropoxy)propyl]trimethoxysilane

R = X = glycidoxypropyl wherein n is an integer ranging from 1 to approximately 25 and/or such that the resultant compound is oligomeric.

Preferably, the silane adhesion promoter is present from approximately 0.5 percent to approximately 2 percent by weight of the structural adhesive.

The structural adhesive compositions of the present invention may also contain other materials, such as solvents, rheology modifiers, thixotropic agents, fillers, pigments, etcetera.

Preferred components of the structural adhesives of the present invention are provided below.

Preparation of Adhesive

In a clean vessel, solid bisphenol A resin and diglycidylether of bisphenol F resin were melted together at 200° F. Then Uniseal IPN11 was added and mixed until the mixture was a clear uniform liquid. Next, diglycidylether of bisphenol A, napthalene epoxy resin and core-shell modifier was added. The ingredients were mixed together until a uniform mixture was achieved. The mixer was cooled to 100° F. Next, the rheology modifier, thixotropic filler, surfactant, dynasylan VPS4721 and color pigment were added and mixed for 10 minutes until the paste was uniform. Then, the inorganic filler was added and mixed for 10 minutes to generate a uniform paste. Next, the paste was mixed for an additional 20 minutes under vacuum (28"Hg minimum). Then, dicyandiamide, omicure and technicures were added and mixed together for 10 minutes. The paste was then mixed for an additional 20 minutes under vacuum (28"Hg minimum) to generate a uniform paste. Table 1 shows multiple compositions that were prepared.

TABLE I

| Raw material | A1 | A2 | A3 | A4 | A5 |
|---|---|---|---|---|---|
| YDF170 | 10 | 10 | 10 | 15 | 5 |
| YDF 017 | 10 | 10 | 10 | 15 | 5 |
| DER 331 | 27 | 27 | 27 | 17 | 17 |
| Uniseal IPN11 | 0 | 21 | 10.5 | 10.5 | 20 |
| MX 257 | 21 | 0 | 10.5 | 10.5 | 21 |
| Rheology modifier | 3 | 3 | 3 | 3 | 3 |
| Thixotropic filler | 5 | 5 | 5 | 5 | 5 |
| Inorganic filler | 8 | 8 | 8 | 8 | 8 |
| Color pigment | 0.2 | 0.2 | 0.2 | 0.2 | 0.2 |
| Substrate wetting agent | 0.8 | 0.8 | 0.8 | 0.8 | 0.8 |
| Corrosion resistant pigment | 7.5 | 7.5 | 7.5 | 7.5 | 7.5 |
| Omicure DDA-10 | 4 | 4 | 4 | 4 | 4 |
| Technicure IPDU-8 | 1 | 1 | 1 | 1 | 1 |
| Technicure MDU-11 | 0.5 | 0.5 | 0.5 | 0.5 | 0.5 |
| Dynasylan VPS4721 | 1 | 1 | 1 | 1 | 1 |
| Technicure LC-80 | 1 | 1 | 1 | 1 | 1 |

Diglycidylether of Bisphenol-A resin (DER 331) (Olin Corporation)
Diglycidyleither of Bisphenol-F resin (YDF-170) (Kukdo Corporation)
Solid Bisphenol-A epoxy resin (YD-017) (Kukdo Corporation)
Reactive toughner (Uniseal IPN11) (Uniseal Inc.)
Core-shell impact modifier (MX-257) (Kaneka Corporation)
Dicyandiamide (Omicure DDA-10) (Emerald Materials)
Corrosion resistant pigment (Halox BW 191) (Halox)
Rheology modifier (Ultra bond) (Cabot Corporation)
Thixotropic filler (BK100BH2) (JYChemical)
Cycloaliphatic substituted urea (Technicure IPDU-8) (ACCI)
4,4' Menthylene bis(phenyl dimethy urea) (Technicure MDU-11)
(ACCI)
Modified imidazole (Technicure LC-80) (ACCI)
Epoxy silane oligomer (Dynasylan VPS4721) (Evonik)

Rheometer Viscosity

Viscosities of each formulation in the table were evaluated according to rotational TA instrument stress-controlled rheometer. A 25 mm parallel plate geometry was used with an initial gap setting of 450 microns. Adhesive squeeze out was then removed and the gap set to 450 microns to maintain a consistent sample volume. Sample temperature was maintained at 15° C. using temperature control plate of 0.01° C. resolution. A peak hold flow test was run at a shear rate of 3 1/s for 3 minutes with sampling every 10 seconds. The viscosity was taken at 3 minutes where steady was achieved.

Viscosity on Exp-1 is 2321±24 Pa·s, Exp-2 is 2820±36 Pa·s, Exp-3 is 2840±31 Pa·s, Exp-4 is 2520±26 Pa·s, and Exp-5 is 3046±44 Pa·s.

Preparation of Test Specimens:

For lap shear strength (ASTM D 1002), testing substrates include 1.5 mm thickness electrogalvanized (60E) steel, 1.5 mm thickness hot-dipped galvanized steel (HDG), 1.8 mm thickness cold rolled steel (CRS), and 1.6 mm thickness aluminum 6022 type received from ACT. Ferrocote 61 Mal Hcl lubricant for Steel & Drycote 2-90 from Quaker Chemical Company was used on the aluminum substrates.

For T-Peel strength (ASTM D 1876) testing substrates include 0.8 mm thickness Electrogalvanized (60E) steel, 0.8 mm thickness hot-dipped galvanized steel (HDG), 0.8 mm thickness cold rolled steel (CRS), and 0.95 mm thickness aluminum 6022 type received from ACT. Ferrocote 61 Mal Hcl lubricant for Steel & Drycote 2-90 from Quaker Chemical Company was used on the aluminum substrates.

For wedge impact peel strength (ISO 11343), testing substrates include 0.8 mm thickness electrogalvanized (60E) steel, 0.8 mm thickness hot-dipped galvanized steel (HDG), 0.8 mm thickness cold rolled steel (CRS), 1.5 mm thickness and aluminum 6022 type received from ACT. Ferrocote 61 Mal Hcl lubricant for Steel & Drycote 2-90 from Quaker Chemical Company was used on the aluminum substrates.

Lap shear specimen (ASTM D 1002): Composition material applied on 1"×4" size substrates, bonding area was 1"×0.5", 0.008" bond line, assembled similar & dissimilar substrate. Cured at 140° C./15 min. (low bake) and 190° C./60 min. (high bake), tested by using speed of 12.5 mm/minute test method.

T-Peel Resistance (ASTM D 1876): Composition material applied on 1"×8" size substrates, bonding area was 1"×4", 0.008" bond line, assembled similar & dissimilar substrates. Cured at 140° C./15 min. (low bake) and 190° C./60 min. (high bake), tested by using speed of 500 mm/minute test method.

Wedge Impact Peel specimen (ISO 11343): Composition material applied on 20 mm×90 mm size substrates, bonding area was 20 mm×30 mm, 0.008" bond line, assembled similar & dissimilar substrate. Cured at 140° C./15 min. (low bake) and 190° C./60 min. (high bake), tested by using speed of 2 m/sec test method.

Results & Discussion

Laps shear strength (MPa) test has been studied for Table 1 compositions and Table 2a contains the results.

TABLE 2a

| Lap shear strength (Mpa) & Adhesion (Mode of failure %) | | | | | | | |
|---|---|---|---|---|---|---|---|
| | | | Exp - A1 | Exp - A2 | Exp - A3 | Exp - A4 | Exp - A5 |
| Tested at Room temperature | | | | | | | |
| Low bake | EG | Strength | 19.53 | 20.78 | 19.98 | 21.33 | 23.47 |
| | | Cohesive failure | 100 | 100 | 100 | 100 | 100 |
| | HDG | Strength | 18.32 | 18.78 | 19.89 | 20.35 | 21.84 |
| | | Cohesive failure | 100 | 100 | 100 | 100 | 100 |
| | CRS | Strength | 20.03 | 20.32 | 20.62 | 21.62 | 23.53 |
| | | Cohesive failure | 100 | 100 | 100 | 100 | 100 |
| | Al | Strength | 18.75 | 18.99 | 19.15 | 19.40 | 20.92 |
| | | Cohesive failure | 100 | 100 | 100 | 100 | 100 |
| High bake | Steel | Strength | 22.64 | 22.31 | 22.46 | 23.68 | 24.94 |
| | | Cohesive failure | 100 | 100 | 100 | 100 | 100 |
| | AL | Strength | 21.80 | 21.77 | 21.49 | 22.01 | 23.58 |
| | | Cohesive failure | 100 | 100 | 100 | 100 | 100 |
| | CRS | Strength | 24.32 | 24.16 | 25.02 | 25.36 | 26.66 |
| | | Cohesive failure | 100 | 100 | 100 | 100 | 100 |
| | Al | Strength | 22.13 | 22.71 | 23.04 | 23.68 | 24.73 |
| | | Cohesive failure | 100 | 100 | 100 | 100 | 100 |
| Conditioned 24 hrs. at −40° C. and tested at −40° C. | | | | | | | |
| Low bake | EG | Strength | 22.65 | 22.98 | 23.01 | 24.98 | 26.44 |
| | | Cohesive failure | 100 | 100 | 100 | 100 | 100 |
| | HDG | Strength | 20.32 | 20.68 | 21.77 | 23.67 | 24.68 |
| | | Cohesive failure | 100 | 100 | 100 | 100 | 100 |
| | CRS | Strength | 22.68 | 22.99 | 23.54 | 26.05 | 27.30 |
| | | Cohesive failure | 100 | 100 | 100 | 100 | 100 |
| | Al | Strength | 19.32 | 20.31 | 20.95 | 21.65 | 23.86 |
| | | Cohesive failure | 100 | 100 | 100 | 100 | 100 |
| High bake | EG | Strength | 21.02 | 21.65 | 22.54 | 23.85 | 25.47 |
| | | Cohesive failure | 100 | 100 | 100 | 100 | 100 |
| | HDG | Strength | 20.32 | 20.63 | 21.22 | 22.68 | 24.27 |
| | | Cohesive failure | 100 | 100 | 100 | 100 | 100 |
| | CRS | Strength | 22.53 | 22.98 | 23.12 | 24.99 | 26.74 |
| | | Cohesive failure | 100 | 100 | 100 | 100 | 100 |
| | Al | Strength | 20.51 | 20.65 | 21.09 | 22.85 | 24.90 |
| | | Cohesive failure | 100 | 100 | 100 | 100 | 100 |
| Conditioned 14 days at 80° C. and Tested at 80° C. | | | | | | | |
| Low bake | EG | Strength | 17.02 | 17.50 | 17.98 | 18.33 | 20.31 |
| | | Cohesive failure | 100 | 100 | 100 | 100 | 100 |
| | HDG | Strength | 15.12 | 15.62 | 16.05 | 17.53 | 18.69 |
| | | Cohesive failure | 100 | 100 | 100 | 100 | 100 |

TABLE 2a-continued

| Lap shear strength (Mpa) & Adhesion (Mode of failure %) | | | | | | | |
|---|---|---|---|---|---|---|---|
| | | | Exp - A1 | Exp - A2 | Exp - A3 | Exp - A4 | Exp - A5 |
| | CRS | Strength | 17.98 | 18.02 | 18.44 | 20.12 | 21.23 |
| | | Cohesive failure | 100 | 100 | 100 | 100 | 100 |
| | Al | Strength | 15.33 | 15.68 | 15.98 | 17.68 | 18.53 |
| | | Cohesive failure | 100 | 100 | 100 | 100 | 100 |
| High bake | EG | Strength | 17.32 | 17.62 | 18.62 | 19.68 | 21.52 |
| | | Cohesive failure | 100 | 100 | 100 | 100 | 100 |
| | HDG | Strength | 16.32 | 16.98 | 18.96 | 19.02 | 20.34 |
| | | Cohesive failure | 100 | 100 | 100 | 100 | 100 |
| | CRS | Strength | 18.22 | 18.63 | 19.65 | 20.98 | 22.56 |
| | | Cohesive failure | 100 | 100 | 100 | 100 | 100 |
| | A | Strength | 18.68 | 18.98 | 19.32 | 20.65 | 22.33 |
| | | Cohesive failure | 100 | 100 | 100 | 100 | 100 |
| CCT (GMW 14124 Cycle U - 10 Cycles) | | | | | | | |
| Low bake | EG | Strength | 13.11 | 13.26 | 13.74 | 14.02 | 17.92 |
| | | Cohesive failure | 90 | 92 | 93 | 95 | 99 |
| | HDG | Strength | 13.41 | 13.68 | 13.81 | 14.11 | 17.71 |
| | | Cohesive failure | 88 | 89 | 91 | 94 | 99 |
| | CRS | Strength | 14.01 | 14.86 | 15.42 | 16.29 | 18.32 |
| | | Cohesive failure | 90 | 90 | 93 | 96 | 99 |
| | Al | Strength | 13.38 | 14.08 | 14.62 | 15.22 | 16.61 |
| | | Cohesive failure | 91 | 93 | 94 | 96 | 99 |
| High bake | EG | Strength | 17.44 | 17.88 | 18.33 | 19.68 | 21.52 |
| | | Cohesive failure | 93 | 94 | 95 | 97 | 99 |
| | HDG | Strength | 16.88 | 16.86 | 18.67 | 19.21 | 20.34 |
| | | Cohesive failure | 94 | 94 | 96 | 96 | 99 |
| | CRS | Strength | 18.68 | 19.02 | 19.71 | 21.73 | 22.56 |
| | | Cohesive failure | 95 | 94 | 96 | 96 | 99 |
| | Al | Strength | 19.14 | 19.68 | 20.12 | 21.63 | 22.33 |
| | | Cohesive failure | 100 | 100 | 100 | 100 | 100 |

Based on above study Exp A5 has been further evaluated for other mechanical properties of T-Peel strength, Wedge impact peel strength at RT, −40° C., +80 C after Corrosion Cycle (GMW 14124 Cycle U-10 Cycle), Tensile properties at RT as well.

Table 3 shows composition A5 T-Peel strength (N/mm) tested RT, −40° C., +80 C after CCT (GMW 14124 Cycle U-10 Cycle)

TABLE 3

| T-Peel strength (N/mm) & Adhesion (Mode of failure %) | | | | | | |
|---|---|---|---|---|---|---|
| Test Condition | | | Room | Conditioned 24 hrs. at −40° C. and tested at −40° C. | Conditioned 14 days at 80° C. and Tested at Temperature | CCT (GMW 14124 Cycle U - 10 Cycle) |
| Low bake | EG | Strength | 7.41 | 6.23 | 6.14 | 5.26 |
| | | Cohesive failure | 100 | 100 | 100 | 99 |
| | HDG | Strength | 8.02 | 6.83 | 6.84 | 5.65 |
| | | Cohesive failure | 100 | 100 | 100 | 99 |
| | CRS | Strength | 7.13 | 5.92 | 5.03 | 5.61 |
| | | Cohesive failure | 100 | 100 | 100 | 99 |
| | Al | Strength | 6.13 | 6.47 | 4.95 | 3.95 |
| | | Cohesive failure | 100 | 100 | 100 | 100 |
| High bake | EG | Strength | 7.99 | 6.69 | 6.74 | 6.44 |
| | | Cohesive failure | 100 | 100 | 100 | 99 |
| | HDG | Strength | 8.74 | 8.99 | 7.01 | 6.45 |
| | | Cohesive failure | 100 | 100 | 100 | 99 |
| | CRS | Strength | 9.41 | 5.84 | 6.23 | 6.75 |
| | | Cohesive failure | 100 | 100 | 100 | 99 |
| | Al | Strength | 6.92 | 6.66 | 5.67 | 4.33 |
| | | Cohesive failure | 100 | 100 | 100 | 100 |

Table 4 shows Exp A5 Wedge Impact Peel Strength (N/mm) tested at RT, −40° C., +80 C after CCT (GMW 14124 Cycle U-10 Cycle).

TABLE 4

| Wedge Impact Peel Strength (N/mm) & Adhesion (Mode of failure %) | | | | | | |
|---|---|---|---|---|---|---|
| Test Condition | | | Room | Conditioned 4 hrs. at −40° C. and tested at −40° C. | Conditioned 14 days at 80° C. and Tested at Temperature | CCT (GMW 14124 Cycle U - 10 Cycle) |
| Low bake | EG | Strength | 26.69 | 18.59 | 16.62 | 16.52 |
| | | Cohesive failure | 100 | 100 | 100 | 99 |
| | HDG | Strength | 26.54 | 18.95 | 16.60 | 16.72 |
| | | Cohesive failure | 100 | 100 | 100 | 99 |
| | CRS | Strength | 26.25 | 18.71 | 16.71 | 16.25 |
| | | Cohesive failure | 100 | 100 | 100 | 99 |
| | Al | Strength | 26.07 | 18.93 | 16.58 | 16.54 |
| | | Cohesive failure | 100 | 100 | 100 | 100 |
| High bake | EG | Strength | 27.99 | 19.52 | 16.52 | 16.52 |
| | | Cohesive failure | 100 | 100 | 100 | 99 |
| | HDG | Strength | 28.51 | 19.31 | 17.91 | 17.89 |
| | | Cohesive failure | 100 | 100 | 100 | 99 |
| | CRS | Strength | 28.74 | 20.58 | 17.47 | 17.21 |
| | | Cohesive failure | 100 | 100 | 100 | 99 |
| | Al | Strength | 27.06 | 19.41 | 16.53 | 17.81 |
| | | Cohesive failure | 100 | 100 | 100 | 100 |

Tensile properties of Modulus of Elasticity (MPa) & Elongation at break (%) studied as per ASTM D638, Exp A5 cured at 160° C./20 min. 3 mm thickness, Type I specimen, W=10 mm, G=50 mm, 5 mm/min pull rate, used extensometer tested at RT, −40° C. & 80° C. Results shown in Table 5.

TABLE 5

| Test condition | Modulus of Elasticity (MPa) | Elongation at Break (%) |
|---|---|---|
| At RT | 1697 | 9.98 |
| At 80° C. | 757 | 26.76 |

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A one-component curable structural adhesive composition which cures to form a cured product, comprising:
- a bisphenol A liquid epoxy resin;
- a bisphenol F liquid epoxy resin;
- a bisphenol A solid epoxy resin;
- a first toughening agent, wherein the first toughening agent comprises an epoxy terminated polyurethane interpenetrating network present from approximately 10 percent to approximately 25 percent of the total weight of the composition;
- a second toughening agent;
- at least one filler material;
- a substrate wetting agent;
- a corrosion inhibiting agent;
- an amine curing agent;
- a modified imidazole curing agent;
- an accelerating agent;
- a silane adhesion promoter; and
- wherein the structural adhesive composition is low energy curable, and the cured product is crash durable and exhibits high wash resistance.

2. The one-component structural adhesive composition according to claim 1, wherein the adhesive composition is a room temperature pumpable structural adhesive composition which is capable of curing at temperatures below 140° C. in 15 minutes or less.

3. A cured product formed using the one-component structural adhesive composition according to claim 2.

4. The one-component structural adhesive composition according to claim 1, wherein the bisphenol A liquid epoxy resin comprises a bisphenol A diglycidyl ether epoxy resin present from approximately 15 percent to approximately 40 percent of the total weight of the composition.

5. The one-component structural adhesive composition according to claim 4, wherein the bisphenol A diglycidyl ether epoxy resin is represented by the following chemical structure and derivatives thereof:

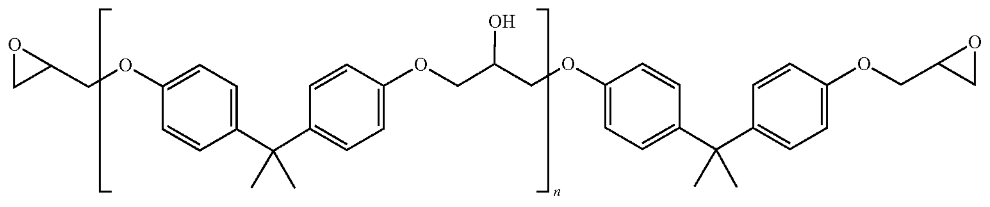

wherein n is 0 or an integer ranging from 1 to approximately 25.

6. The one-component structural adhesive composition according to claim 1, wherein the bisphenol F liquid epoxy resin comprises a bisphenol F diglycidyl ether epoxy resin present from approximately 5 percent to approximately 20 percent of the total weight of the composition.

7. The one-component structural adhesive composition according to claim 6, wherein the bisphenol F diglycidyl ether epoxy resin is represented by the following chemical structure and derivatives thereof:

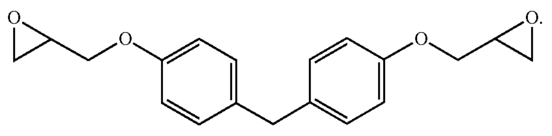 [SMILES: c1cc(OCC2CO2)ccc1Cc1ccc(OCC2CO2)cc1]

8. The one-component structural adhesive composition according to claim 1, wherein the bisphenol A solid epoxy resin comprises a bisphenol A unmodified solid epoxy resin present from approximately 5 percent to approximately 20 percent of the total weight of the composition.

9. The one-component structural adhesive composition according to claim 1, wherein the first toughening agent is represented by the following chemical structure and derivatives thereof:

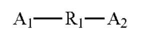

wherein $A_1$ is represented by the following chemical structure:

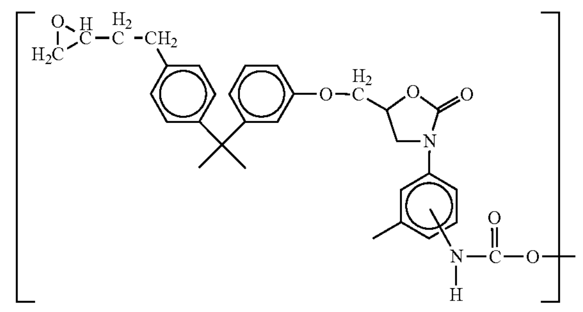

wherein $R_1$ comprises an alkyl, alkenyl, and/or alkynyl group containing 1 to approximately 36 carbon atoms, an oligomer, and/or a urethane polymer; and wherein $A_2=A_1$.

10. The one-component structural adhesive composition according to claim 1, wherein the second toughening agent comprises polybutadiene rubber particles pre-dispersed into a thermosetting resin present from approximately 10 percent to approximately 25 percent of the total weight of the composition.

11. The one-component structural adhesive composition according to claim 1, wherein the at least one filler material comprises inorganic oxides, fumed silica, carbon black, and/or calcium metasilicate present from approximately 5 percent to approximately 15 percent of the total weight of the composition.

12. The one-component structural adhesive composition according to claim 1, wherein the substrate wetting agent comprises a silicone acrylate copolymer, a polysiloxane and/or fluoro-modified surfactants present from approximately 0.5 percent to approximately 5 percent of the total weight of the composition.

13. The one-component structural adhesive composition according to claim 1, wherein the corrosion inhibiting agent comprises barium phosphosilicate present from approximately 5 percent to approximately 10 percent of the total weight of the composition.

14. The one-component structural adhesive composition according to claim 1, wherein the amine curing agent comprises a dicyandiamide present from approximately 2 percent to approximately 10 percent of the total weight of the composition.

15. The one-component structural adhesive composition according to claim 1, wherein the modified imidazole curing agent comprises an encapsulated modified imidazole present from approximately 0.5 percent to approximately 2 percent of the total weight of the composition.

16. The one-component structural adhesive composition according to claim 1, wherein the accelerating agent comprises a substituted urea present from approximately 0.5 percent to approximately 4 percent of the total weight of the composition.

17. The one-component structural adhesive composition according to claim 1, wherein the silane adhesion promoter comprises a bifunctional organosilane possessing a reactive organic epoxide group and a hydrolysable inorganic methoxysilyl group present from approximately 0.5 percent to approximately 2 percent of the total weight of the composition.

18. The one-component structural adhesive composition according to claim 1, further comprising a solvent, a rheology modifier, a thixotropic agent, and/or a pigment.

19. A one-component curable structural adhesive composition which cures to form a cured product, comprising:

a bisphenol A liquid epoxy resin, wherein the bisphenol A liquid epoxy resin is present from approximately 15 percent to approximately 40 percent of the total weight of the composition;

a bisphenol F liquid epoxy resin, wherein the bisphenol F liquid epoxy resin is present from approximately 5 percent to approximately 20 percent of the total weight of the composition;

a bisphenol A solid epoxy resin, wherein the bisphenol A solid epoxy resin is present from approximately 5 percent to approximately 20 percent of the total weight of the composition;

a first toughening agent, wherein the first toughening agent comprises an epoxy terminated polyurethane interpenetrating network present from approximately 10 percent to approximately 25 percent of the total weight of the composition;

a second toughening agent, wherein the second toughening agent is present from approximately 10 percent to approximately 25 percent of the total weight of the composition;

one or more filler materials, wherein the filler material(s) is present from approximately 5 percent to approximately 15 percent of the total weight of the composition;

a substrate wetting agent, wherein the substrate wetting agent is present from approximately 0.5 percent to approximately 5 percent of the total weight of the composition;

a corrosion inhibiting agent, wherein the corrosion inhibiting agent is present from approximately 5 percent to approximately 10 percent of the total weight of the composition;

an amine curing agent, wherein the amine curing agent is present from approximately 2 percent to approximately 10 percent of the total weight of the composition;

a modified imidazole curing agent, wherein the modified imidazole curing agent is present from approximately 0.5 percent to approximately 2 percent of the total weight of the composition;

a first accelerating agent, wherein the first accelerating agent is present from approximately 0.5 percent to approximately 2 percent of the total weight of the composition;

a second accelerating agent, wherein the second accelerating agent is present from approximately 0.5 percent to approximately 2 percent of the total weight of the composition;

a rheology modifier, wherein the rheology modifier is present from approximately 0.5 percent to approximately 2 percent of the total weight of the composition;

a thixotropic agent, wherein the thixotropic agent is present from approximately 2 percent to approximately 10 percent of the total weight of the composition;

a pigment, wherein the pigment is present from approximately 0.05 percent to approximately 1 percent of the total weight of the composition; and a silane adhesion promoter, wherein the silane adhesion promoter is present from approximately 0.5 percent to approximately 2 percent of the total weight of the composition.

20. A cured product formed using the one-component structural adhesive composition according to claim 19.

21. A one-component curable structural adhesive composition which cures to form a cured product, comprising:

a bisphenol A liquid epoxy resin;

a bisphenol F liquid epoxy resin;

a bisphenol A solid epoxy resin, wherein the bisphenol A solid epoxy resin comprises a bisphenol A unmodified solid epoxy resin present from approximately 5 percent to approximately 20 percent of the total weight of the composition;

a first toughening agent;

a second toughening agent;

at least one filler material;

a substrate wetting agent;

a corrosion inhibiting agent;

an amine curing agent;

a modified imidazole curing agent;

an accelerating agent;

a silane adhesion promoter; and wherein the structural adhesive composition is low energy curable, and the cured product is crash durable and exhibits high wash resistance.

* * * * *